US010262208B2

(12) United States Patent
Träff (10) Patent No.: US 10,262,208 B2
(45) Date of Patent: Apr. 16, 2019

(54) AUTOMATIC SELECTION OF CINEMAGRAPHS

(71) Applicant: Microsoft Technology Licensing, LLC, Redmond, WA (US)

(72) Inventor: Gustav Träff, Södra Sandby (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/275,297

(22) Filed: Sep. 23, 2016

(65) Prior Publication Data
US 2018/0089512 A1    Mar. 29, 2018

(51) Int. Cl.
| G06K 9/00 | (2006.01) |
| G06K 9/46 | (2006.01) |
| H04N 5/91 | (2006.01) |
| G06F 17/30 | (2006.01) |
| H04N 19/12 | (2014.01) |
| H04N 21/44 | (2011.01) |
| H04N 5/232 | (2006.01) |
| H04N 19/137 | (2014.01) |
| H04N 19/172 | (2014.01) |
| H04N 19/177 | (2014.01) |
| H04N 21/854 | (2011.01) |

(52) U.S. Cl.
CPC .... G06K 9/00718 (2013.01); G06F 17/30811 (2013.01); G06K 9/00335 (2013.01); G06K 9/00536 (2013.01); G06K 9/00744 (2013.01); G06K 9/4671 (2013.01); H04N 5/23251 (2013.01); H04N 5/91 (2013.01); H04N 19/12 (2014.11); H04N 19/137 (2014.11); H04N 19/172 (2014.11); H04N 19/177 (2014.11); H04N 21/44008 (2013.01); H04N 21/85406 (2013.01)

(58) Field of Classification Search
CPC ........... G06K 9/00718; G06K 9/00335; G06K 9/00744; G06K 9/4671; G06T 7/246; G06T 7/215; H04N 5/23251; H04N 5/91
See application file for complete search history.

(56) References Cited

U.S. PATENT DOCUMENTS

| 6,727,949 B1 | 4/2004 | Saruwatari et al. |
| 8,363,121 B2 | 1/2013 | Maeng |
| (Continued) | | |

OTHER PUBLICATIONS

Yeh, Mei-Chen, "Selecting Interesting Image Regions to Automatically Create Cinemagraphs", In Proceedings of IEEE MultiMedia, vol. 23, Issue 1, Jan. 23, 2015, pp. 72-81.

(Continued)

Primary Examiner — Brenda C Bernardi (57) ABSTRACT

A method is presented for making an automatic selection of a media file type. The method comprises receiving a sequence of digital images of a scene; performing object classification in at least one of the received digital images to determine the presence and class of an object in the scene. The method also comprises performing motion detection in the received sequence of digital images to determine the presence and salience of motion in the scene. A media file type is automatically selected on the basis of the above analysis, and is selected from a still image and a cinemagraph. In some embodiments, the selection also includes a living image. A media file of the selected type is then created.

20 Claims, 4 Drawing Sheets

(56) References Cited

U.S. PATENT DOCUMENTS

| | | | |
|---|---|---|---|
| 8,875,204 B2* | 10/2014 | Kitazato | H04N 21/854 725/93 |
| 9,111,146 B2* | 8/2015 | Dunlop | G06K 9/00718 |
| 9,210,319 B2 | 12/2015 | Rav-Acha et al. | |
| 9,479,696 B1* | 10/2016 | Miller | G06Q 50/01 |
| 9,704,281 B2* | 7/2017 | LeBlanc | G11B 27/034 |
| 2007/0230911 A1* | 10/2007 | Terasaki | G11B 27/10 386/230 |
| 2010/0182443 A1 | 7/2010 | Tsujimura et al. | |
| 2011/0116708 A1* | 5/2011 | Zhou | G06K 9/469 382/164 |
| 2013/0259375 A1* | 10/2013 | Dunlop | G06K 9/00684 382/173 |
| 2013/0300750 A1* | 11/2013 | Mishra | G06T 13/00 345/474 |
| 2014/0111662 A1 | 4/2014 | Mashiah | |
| 2014/0111670 A1 | 4/2014 | Lord et al. | |
| 2015/0104113 A1* | 4/2015 | Ugur | G06K 9/34 382/283 |
| 2015/0324096 A1 | 11/2015 | Leblanc et al. | |
| 2015/0341591 A1 | 11/2015 | Kelder et al. | |
| 2016/0086368 A1 | 3/2016 | Laaksonen et al. | |
| 2016/0353052 A1* | 12/2016 | Traff | H04N 1/212 |
| 2017/0213378 A1* | 7/2017 | Mandel | G06T 13/80 |
| 2017/0285922 A1* | 10/2017 | LeBlanc | G11B 27/034 |
| 2017/0316256 A1* | 11/2017 | Kim | G06T 7/2006 |

OTHER PUBLICATIONS

Tompkin, et al., "Towards Moment Imagery: Automatic Cinemagraphs", In Proceedings of Conference for Visual Media Production, Nov. 16, 2011, pp. 87-93.

Yeh, et al., "A Tool for Automatic Cinemagraphs", In Proceedings of the 20th ACM international conference on Multimedia Oct. 29, 2012, pp. 1259-1260.

Bai, et al., "Automatic Cinemagraph Portraits", In Proceedings of the Eurographics Symposium on Rendering, vol. 32, No. 4, Jun. 19, 2013, 9 pages.

Blandford, Rafe, "More details on "Living Images" in Lumia 930 / Lumia Cyan", Published on: Apr. 15, 2014, 9 pages, Available at: http://allaboutwindowsphone.com/flow/item/19676_More_details_on_Living_Images_.php.

U.S. Appl. No. 14/721,183, Träff, et al., "Dynamic length of living images", filed May 26, 2015, 39 pages.

Liao, et al., "Automated Video Looping with Progressive Dynamism", In Journal of ACM Transactions on Graphics, vol. 32, Issue 4, Article 77, Jul. 21, 2013, 10 Pages.

"International Search Report and Written opinion Issued in PCT Application No. PCT/US2017/051680", dated Dec. 20, 2017, 13 Pages.

* cited by examiner

AUTOMATIC SELECTION OF CINEMAGRAPHS

BACKGROUND

Visual imagery commonly can be classified as either a static image (photograph, painting, etc.) or dynamic imagery (video, animation, etc.). A static image captures a single instant in time. A video provides a temporal narrative through time.

Another category of visual media that mixes a static image with moving elements has recently become more prevalent. A classic example is an animated Graphics Interchange Format (GIF), originally created to encode short vector-graphics animations within a still image format. Another example of visual media that juxtaposes still and moving images, which has more recently become popular, is referred to as a cinemagraph. Cinemagraphs commonly combine static scenes with a small repeating movement (e.g., a blinking eye or hair motion). In a cinemagraph, the dynamic element normally loops in a sequence of frames.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method is disclosed which may be used to create still images and cinemagraphs. The method allows automatic selection between at least these two types of media files from a sequence of digital images that capture a scene. The criteria for selection is based on object classification of objects detected in at least one image of the scene, and on detection of motion throughout the scene. In embodiments, additional criteria may weigh in on the selection, such as camera shake detection and object tracking.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

The drawings of the FIGs. are not in scale.

DETAILED DESCRIPTION

The detailed description provided below in connection with the appended drawings is intended as a description of the present embodiments and is not intended to represent the only forms in which the present embodiments may be constructed or utilized. The description sets forth the functions of the embodiments and the steps for constructing and operating the embodiments. However, the same or equivalent functions and sequences may be accomplished by different embodiments.

Figure 1:
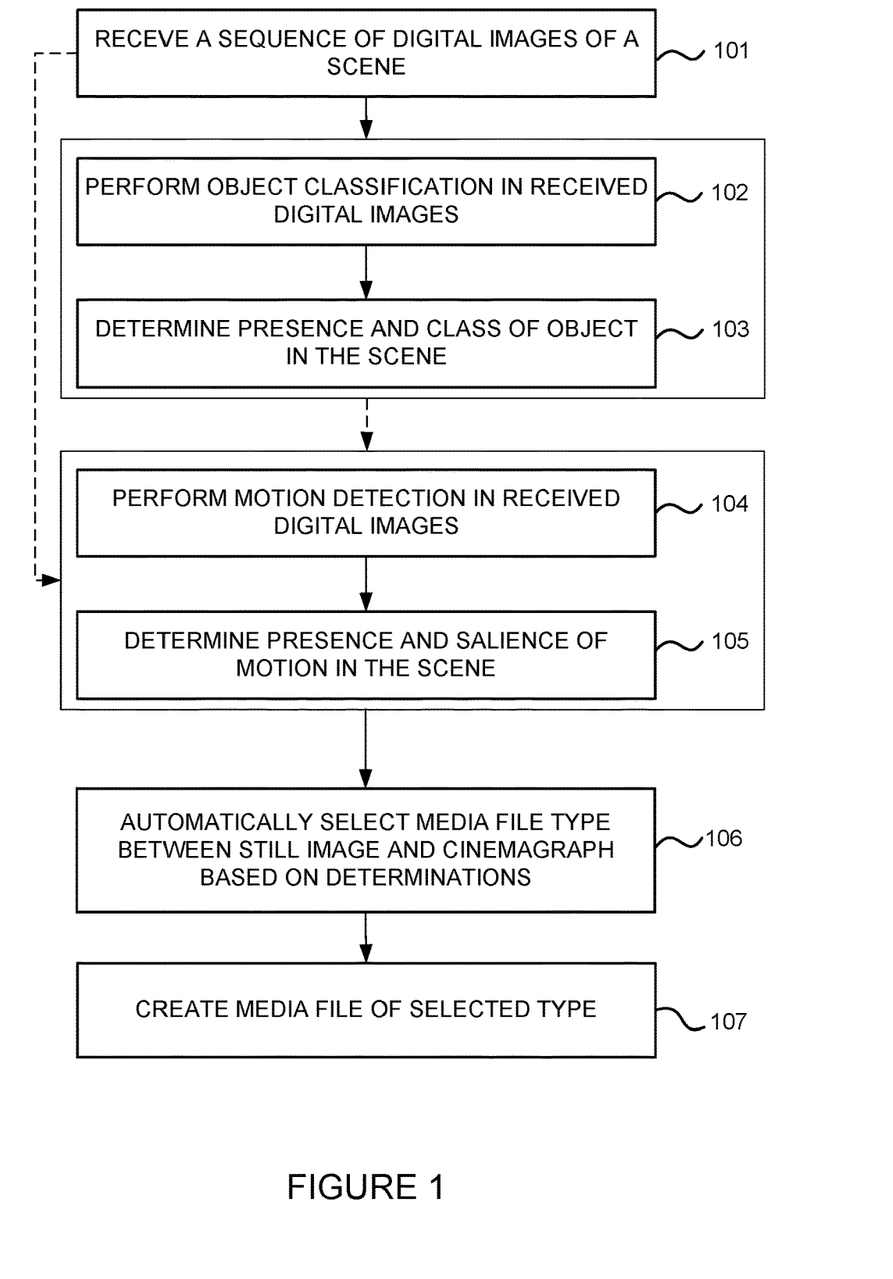
FIG. 1 illustrates a flow chart of a method according to an aspect.

The method of FIG. 1 may be used for selecting a suitable media file type, between file types such as a still image and a cinemagraph. The method may also be used for automatically producing media files of the appropriate type. The method may be carried out, for example, by a device comprising a processor, an image processing unit or by a separate processing unit.

A digital image refers to data captured via exposure of pixels or some other light-sensing element(s) of an image sensor. A media file may be selected from a still image, a video sequence, and any combination thereof as disclosed further.

The method of FIG. 1 starts by receiving, in operation 101, a sequence of digital images of a scene. "Scene" refers to the whole content in the object area shot by a camera, comprising general background of the scene and any movable or stationary objects therein.

In general, the sequence of digital images may comprise any appropriate number of images or image frames. The number of images may correspond to, for example, a displayable image sequence having a length of about 1 to 5 seconds. The actual number of frames then depends on the frame rate to be used. For example, with a constant frame rate of 30 fps (frames per second), the number of frames may be about 30 to 150 frames.

Images of a scene are originally captured by a digital camera during shooting a scene. Being captured during shooting a scene means that the images and frames of the digital image sequence represent sequential moments of the scene and are captured chronologically. The images of the digital image sequence may represent sequential moments separated from each other, for example, by a time interval of 5 to 100 milliseconds.

Receiving a sequence of digital images of a scene may include receiving them from a memory in the form of a pre-recorded video or any other image sequence. Receiving may also refer to receiving a sequence of digital images from an active digital camera used to capture the sequence, as discussed further in relation to FIG. 2.

Object classification in at least one of the received digital images is performed in operation 102. Object classification may include object detection, analysis and association to one or more pre-determined object classes. Objects may have any suitable classifications, and examples may include vehicles, buildings, landmarks, activities, people, faces, facial features etc. These are only a few examples of a wide variety of possible object classes. A list of object classes may be stored in a local memory or accessed remotely.

Results of the object classification may include a list of objects determined in one or more digital images, their location on the image, and the class of the detected object. Object classification is performed to determine and establish presence and class of an object in the scene, as marked by operation 103.

The method also comprises performing, in operation 104, motion detection on the received sequence of digital images. Motion detection may include a plurality of techniques aimed at detecting a change in the images of the sequence. The change may only register when the change is significant enough. A map of motions and changes that happen throughout the scene captured in the sequence of digital images can be provided as a result. The motions may include motions of individual objects against a background, areas of an image, the whole image frame and other motions. The motion detection 104 is performed to determine if there is any motion in the scene, and whether this motion is salient. "Salience" of motion may be determined if a motion fulfils a predetermined parameter that can be adjusted by a user or device manufacturer. For example, if a blink of an eye of a person is to be captured as a cinemagraph, then small motions of the eyelids against a substantially stationary face of that person should fulfil the predetermined parameter for a salient motion. In combination with an object classification of the eyes and other facial features, a precise determination of objects and movements surrounding the object can be made.

In an embodiment, motion detection may also be supplemented with image stabilization or correction that occur due to camera movement (as opposed to actual movement of objects in the frame). The correction may include, for example, changing angles of the image frame to adapt to camera shake.

Object classification, including consequent operations 102 followed by 103, and motion detection, including operations 104 followed by 105, may be performed in any order or in parallel.

In an embodiment, the method comprises performing image categorization on at least one of the received images. The categories of images may comprise nighttime, daytime, indoors, outdoors, nature is inside or outside and a more abstract image description such as nature, office urban.

Based on the determined presence and class of an object in the scene, as well as the detected motion and its salience, an automatic selection of media file type is made automatically in operation 106. The media file type is selected from at least a still image and a cinemagraph. "Cinemagraph" herein refers to a still image comprising at least one moving area, or dynamic area, which includes continuous or momentary movement. The moving area can be formed of parts of digital images from the sequence. Parts of digital images from the sequence can be located approximately in the same area as the moving area of the cinemagraph. The movement in the moving area may be played back on repeat, looped, or randomized. The area that remains dynamic is determined automatically based on the salience of movement and object classification (including object location). In an embodiment, the user may be prompted to adjust or define dynamic areas of the cinemagraph.

"Automatically" refers generally to performing the operation(s) at issue, for example, selecting the media file type, by an appropriate data processing unit or module according to predetermined rules and procedures, without need for any contribution provided or determination performed by a user of a device incorporating such unit or module.

After the file type selection in 106, a media file of the selected type is created in operation 107. According to an embodiment, the created media file is stored in a memory in a further operation of the method. In an embodiment, if the selected media file type is a cinemagraph, the method may also provide the user with an option to change it into a still image later. In an embodiment, the media file type is selected between a still image, a cinemagraph and a living image, wherein a "living image" comprises a still image and a preceding image sequence.

"Living image" refers to a collection of images displayed as a combination of a still image and a short video or other type of sequentially displayed image sequence preceding the still image. By forming such living image, a representation of a captured moment may be generated which corresponds to the general nature of the scene. The length of such short preceding image sequence displayed in connection with the still image may vary, for example, from 200 to 300 ms to one or a couple of seconds.

The automatic selection based on the presence and class of an object in the scene, and presence and salience of motion in the scene, can be generally made depending on the various combinations of these and other parameters. Examples of criteria for such selection are discussed below. A class of the object may be sufficient to make a selection of cinemagraph, a still image or a living image. A spatial location of the object in the scene, relationship between the detected object and other objects in the scene, and trajectory of the moving object may be factors for making the selection.

In an embodiment, objects may be additionally classified as "objects more suitable for cinemagraph", "objects more suitable for still image" and, for example, "objects more suitable for living image". Similarly, the additional classification may include "objects not suitable for cinemagraph", and other classes not suitable for e.g. living images. With this additional classification, the selection of media file type can be made on the basis of the object class, the additional object class and the motion that happens in the scene.

In an embodiment wherein the sequence of digital images is received from a pre-recorded video in operation 101, the method can further comprise creating two or more media files of the selected type from two or more parts of the received pre-recorded video. The method may be used to produce additional content such as select cinemagraphs or living images from an existing video.

"Receiving" the image sequence refers to any appropriate way of providing available, for automatic processing purposes, data content(s) corresponding to those images. For example, such data may be fully or partially received via any data transmission path from a device, data server or, for example, a cloud service. It may also be stored on any appropriate data storage medium or device. Receiving may also comprise generating the data content at issue, for example, via analysis of some appropriate data, such as a plurality of frames.

Figure 2:
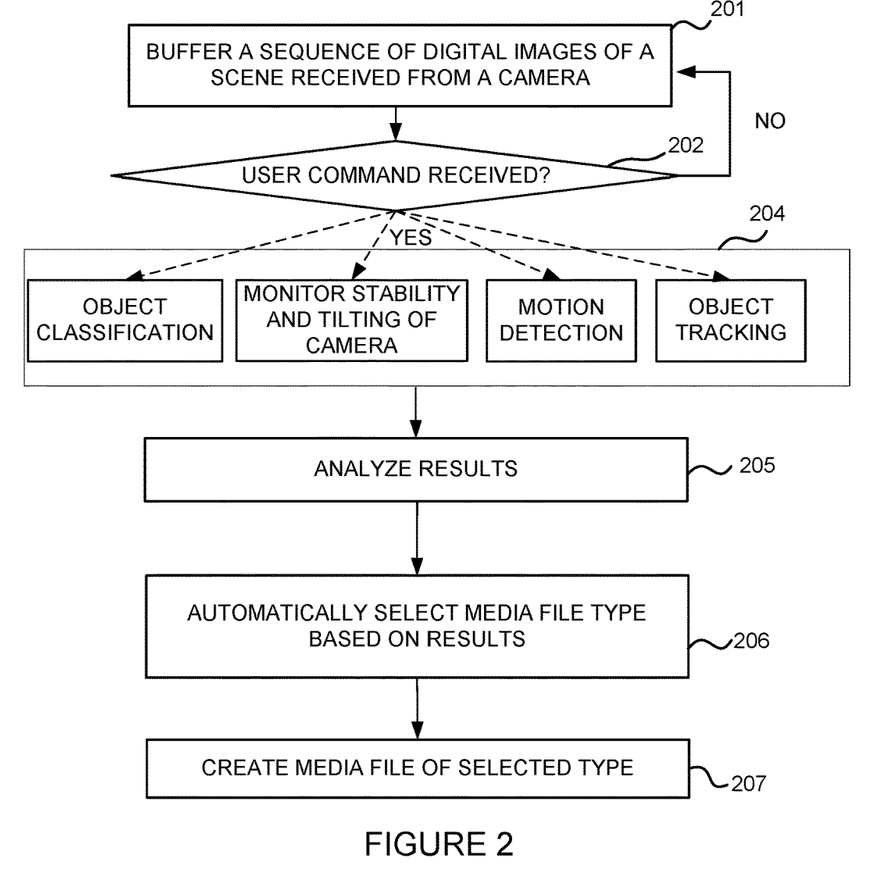
FIG. 2 illustrates a flow chart of a method according to an embodiment.

FIG. 2 shows a method according to an embodiment, wherein the operations are prompted by a user command. In this embodiment, the sequence of digital images of a scene is received from an active digital camera. If the method is performed by a device comprising an image processor, the digital camera may be part of this device, or may be a connected a standalone digital camera. The camera may be activated by a user or automatically, and continuously capture a video feed while active. The digital camera may be of any type capable of performing such capture of sequential images with short intervals. It may be a stand-alone camera apparatus, such as a compact camera, a digital SLR (single-lens reflex) camera, or a digital mirrorless interchangeable-lens camera. Alternatively, it may be a camera module or element incorporated in an apparatus or device, such as a mobile or wearable device.

The method comprises buffering 201 three or more frames of the received sequence in a memory, and receiving 202 a user command to create a media file. The digital camera may be configured to create a video stream when active, and the video stream can be received and buffered as a sequence of images according to the method.

The image frames may be buffered captured using, for example, a video capture mode, or a burst capture mode, or a continuous high speed still image capture mode. The interval of capture may correspond, for example, to any standard video displaying frame rate. In general, the preliminary frames may be captured with an interval of 5 to 100 ms between the consecutive frames.

The first-in-first-out type buffer sequence having a predetermined number of frames forms an image sequence with a continuously changing set of images. First-in-first-out refers to a principle according to which, when a new image is captured and stored in the buffer, the oldest image is removed from it. Thereby, the buffer holds a predetermined number of most recent images at all times. The FIFO buffer may be, for example, a ring buffer.

The sequential capturing of frames and the storing of the captured frames into the FIFO buffer may be carried out as a continuous operation always when the camera is in use and ready for image capturing initiated by the user of the camera. Thus, the FIFO buffer may be maintained and updated continuously also when no actual image capturing is initiated by the user. Updating the FIFO buffer sequence by storing the new images is stopped when an image capturing user input is received, whereby the content of the buffer sequence is fixed. Possible reception of an image capturing user input is checked after capturing and storing each new preliminary frame.

The user command 202 may be a press of a shutter button on an active camera, a touch of a touchscreen in a location assigned to image capture, a voice command to take a picture, or any other command indicating that the user wishes to create a media file.

The method further includes four operations, grouped as 204, which can be performed in any order or in parallel. The operations include object classification and motion detection, as in the embodiment described with regard to FIG. 1. The additional two operations are monitoring stability and/or tilting of the camera used to capture the digital images, and, if an object is detected in the scene, tracking the detected object. If the image stabilization and monitoring tilt is performed before the other operations of 204, it can provide information on the overall movement and shake of the camera. In case the movement intensity exceeds a certain threshold, a cinemagraph or living image selection may be blocked in advance before the other operations are performed. The object tracking, combined with object classification and movement detection, can give a more specific identification of a salient movement that can be included into a cinemagraph as a moving area. A technical effect of the combination of operations 204 is that they can be used in synergy to make a more accurate selection of an appropriate media file type, also in real time. Other operations may be performed to determine conditions for selection of media file types, according to embodiments.

The operations 204 may be carried out continuously over the buffered sequence of digital images, or over a subset of the buffered sequence of digital images. Data produced with these operations may also be buffered or stored.

After the results of the four operations 204 are analyzed in operation 205, the method further comprises selecting a media file type in 206 based on the combined results of the analysis 205. Once the media file type is selected, a media file of the selected type is created next in operation 207.

A technical effect of any of the above methods and embodiments can consist in improved user experience in selecting and creating media files of the listed types. This can be achieved by removing the necessity of manual selection between a cinemagraph, a still image or a living image as an output. This can be useful both in automatic selection of capture mode, if the methods are used in devices with a camera during capture; and to automatic video editing if the received image sequence is from a pre-recorded video.

Figure 3A:
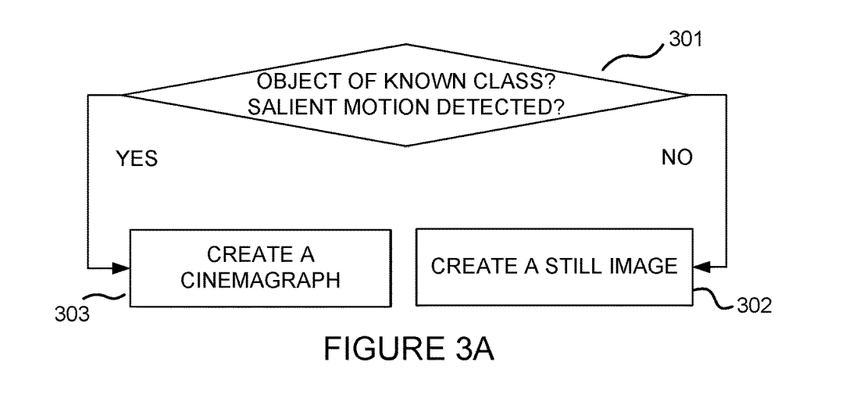
FIG. 3A illustrates a flow chart of a selection according to an embodiment.
Figure 3B:
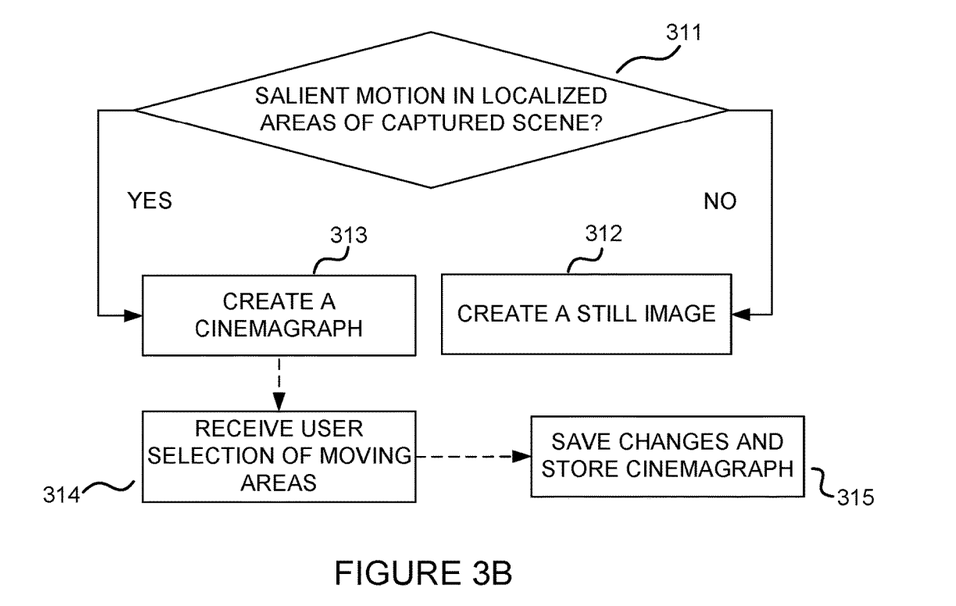
FIG. 3B illustrates a flow chart of a selection according to another embodiment.
Figure 3C:
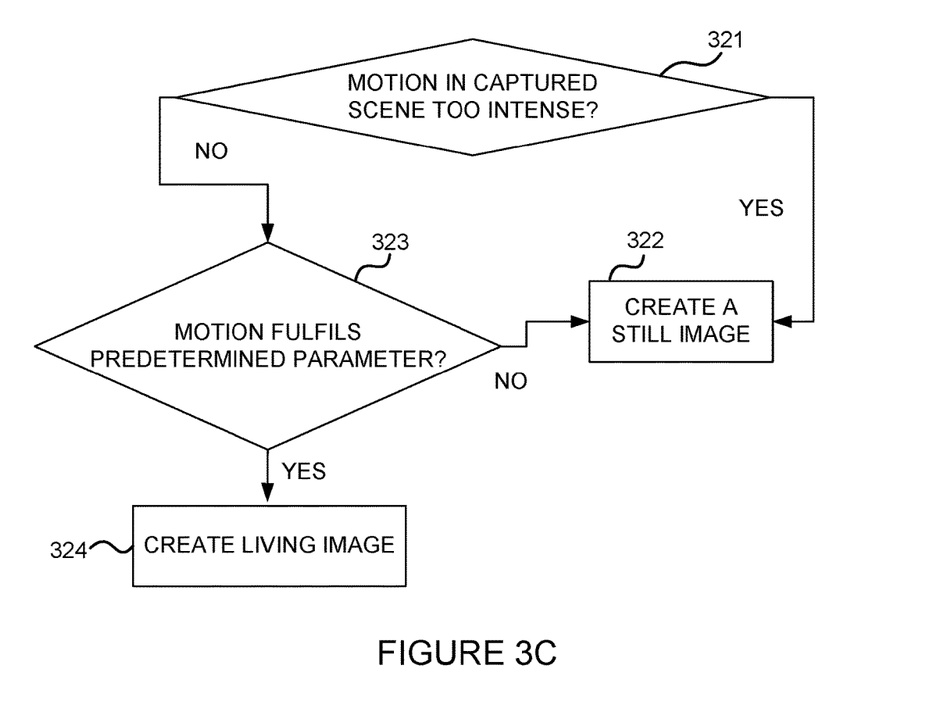
FIG. 3C illustrates a flow chart of a selection according to a further embodiment.

FIGS. 3A-3C illustrate conditions that can serve as a basis for the automatic selection between media file types according to the methods described above.

In an embodiment illustrated on FIG. 3A, the condition 301 is established by the results of object classification and salient motion. Namely, a cinemagraph is selected and created at 303 if the scene includes an object of a predetermined class, and a motion in at least one area of the scene. The conditions may be specified further according to various implementations. In a cinemagraph created this way at 303, the salient motion associated with an object of a known class may constitute the dynamic (moving) area, wherein the rest of the scene may be captured in a still image part. If no motion is determined to be present in the scene, and no objects can be classified, a still image is selected and created instead at 302.

As an example only, a fountain may be recognized as an object class, and the motion of water may be detected as salient motion, which can result in selecting a cinemagraph as a media file type, and creating a cinemagraph in which the water coming out of the fountain would constitute the moving area. In this and other examples, salient motion may be determined as motion in the dynamic areas of a scene that is repeatable, and may be recognized based on the object classes. This provides an example of criteria for selecting a cinemagraph as a media file type.

In an embodiment, two or more areas of the scene can include detected salient motion. In this case, once the salient motion is detected 311 in localized areas of the scene, a cinemagraph can be automatically selected as the preferred media file type. This is illustrated in FIG. 3B. The cinemagraph may be created at 313 with multiple moving areas. After creating the cinemagraph 313, the device may prompt the user to enter a selection of moving areas that are to remain in a cinemagraph. This can be prompted, for example, on a screen of the device, to be selected by any suitable input means. When this selection is received at 314, changes to the cinemagraph are saved, and the cinemagraph is stored in a memory 315.

Receiving further user input 314 on cinemagraph dynamic areas can have an effect on the overall area accuracy when a cinemagraph is created, and provide the ability for a user to customize it to his or her taste.

FIG. 3C shows more criteria related to motion in the scene. The determination of motion intensity made at 321 may be based on detected stability and/or tilting state of the camera exceeding a predetermined threshold at the time when the user command to create a media file is received. This results in creating 322 a still image and cutting off the selection, which can help preserve resources of a device. In another embodiment, a still image is still selected as the media file type if the motion is detected in a majority of the scene and/or exceeds a predetermined intensity. For example, intense motion in the majority of a scene can be achieved if the camera used to capture the image sequence is moving at a high speed. Even if the camera itself is stable and has no tilt, a scene captured from the window of a fast train is likely to have plenty of intense motion in most of the frame. A still image is created in this scenario as well.

In an embodiment, a still image may be selected as the media file type on the basis of an object class detection, wherein the detected object class is pre-determined to limit the selection to a still image when no other objects, or no objects of a different object class, are detected in the same scene.

In an embodiment, wherein the media file type is selected from a still image, a cinemagraph and a living image of the scene, the living image comprising a still image and a preceding image sequence. The additional media file type may be selected based on the same measurements and results as described above in relation to selection between a still image and a cinemagraph. In an alternative embodiment, a living image of the scene is selected as the media file type if a motion in the scene fulfils at least one predetermined parameter, as shown in 323. The predetermined parameters may be based on the motion of a detected object, and the object class. For example, if motion of an object does not constitute a repeatable motion, but the movement intensity and object class is suitable for a living image, then a living image may be selected as the media file type. In an embodiment, if the motion is detected in a majority of a scene, for example due to movement of the camera or a zooming action, a living image may be selected as the media file type. The selection may also be based on the direction and trajectory of the movement, its intensity and objects that can be tracked in the moving scene.

After a successful selection, the living image is created at 324.

In the above, aspects mainly related to method embodiments are discussed. In the following, more emphasis will be given on device and apparatus aspects.

What is described above with regard to definitions, details, ways of implementation, and advantageous effects of the methods apply, mutatis mutandis, to the device and apparatus aspects discussed below. The same apply vice versa. Further, the following apparatuses and devices are examples of equipment for performing the methods described above. The other way around, the previous methods are examples of possible ways of operation of the apparatuses and devices described below.

Figure 4:
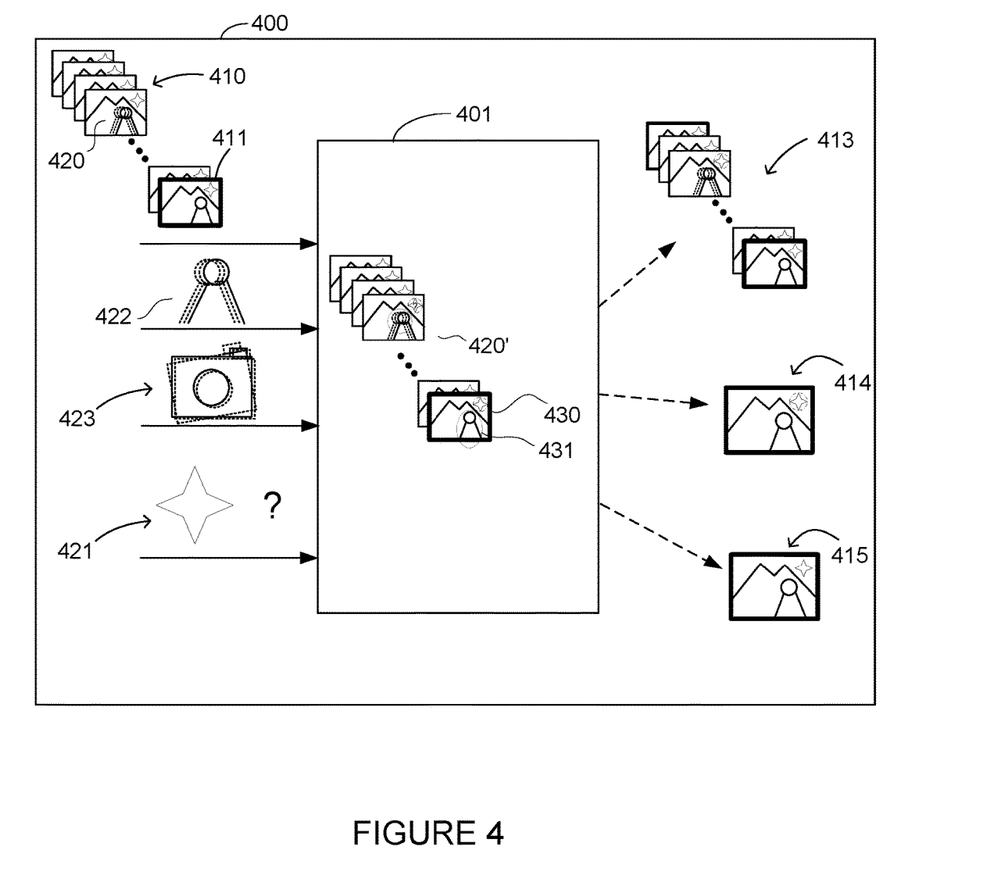
FIG. 4 illustrates an apparatus according to an aspect.

The apparatus 400 of FIG. 4 comprises an image processing unit 401. The image processing unit is configured to select, from a received image sequence of a scene, a media file type that will be created, wherein the selection is between a cinemagraph and a still image. In the following, the operation of the image processing unit, when in use, is discussed.

When in use, the image processing unit 401 receives a sequence 410 of digital images of a scene 420. The sequence 410 may be a received from a video or an active digital camera. The apparatus 400 may comprise a digital camera or store the video in a memory (not shown in the Figure). The most recent image 411 is highlighted in the figure for exemplary purposes only, and comprises an approximate "moment of interest". This may be, for example, a point of capture if the device 400 comprises a camera and a user gives a command to make a picture.

The image processing unit 401 performs object classification 421 in at least one of the received images to determine the presence and class of an object in the scene, and motion detection 422 through the sequence of received images 410 to determine the presence and salience of motion in the scene. The intermediary images in which the object and motion are also present are denoted by 420'.

The functions 421 and 422 are illustrated as icons with arrows on the left side of the image sensor. In an embodiment, each of the functions 421, 422 and 423 can be implemented in separate units.

Additional functions may also be implemented in the apparatus 400, wherein the image processing unit 401 can be configured to detect stability and/or tilting 423 of the camera, and to perform object tracking (not shown in the Figure).

The objects 430 and 431 are provided in FIG. 4 as examples only. The detected object 431 is a silhouette of a moving person, and the object 430 is a source of light illustrated schematically as a four point star. For example purposes, the source of light 430 has varying intensity and looks slightly different on different images.

In this example, after obtaining the results of motion detection 422 and object classification 421, as well as other functions 423, the image processing unit 401 determines the presence of a moving silhouette 431 and recognizes the object class as "person". The movement is quite fast and directional, which is not reversible and would not form a loop. Therefore, area of the scene 420 with a moving silhouette 431 does not include salient motion suitable for a cinemagraph. The image processing unit 420 may be configured to select and create a still image 415 as the resulting media file. In an embodiment, the image processing unit may be configured to track the moving silhouette and to select a living image 413 as the resulting media file. For example, the living image may highlight a particular movement of the person against an otherwise quiet background.

However, the star 430 may also be classified as "light source" after object classification. The light is produced unevenly, creating minor change in the shape of the light source 430 between different image frames. This change can be detected after the image processing unit performs motion detection 422 of the images 420. Since the change in shape can be displayed in a repeatable manner and does not constitute intense movement, the image processing unit 420 may be configured to select and create a cinemagraph 414 wherein the silhouette 431 is still, but the light source 430 is part of a dynamic area of the cinemagraph 414.

In the example shown in FIG. 4, the camera that was used to capture the image sequence 420 is static, hence detecting the stability and/or tilting 423 of the camera does not limit the outcome to a still image 415. In other examples, wherein the majority of the image is moving, or excessive camera shake is detected, the image processing unit 401 may be configured to skip the selection according to other parameters and only create a still image 415.

Being "configured to" perform the above operations when in use refers to the capability of and suitability of the image processing unit for such operations. This may be achieved in various ways. For example, the image processing unit may comprise at least one processor and at least one memory coupled to the at least one processor, the memory storing program code instructions which, when run on the at least one processor, cause the processor to perform the action(s) at issue. Alternatively, or in addition, the functionally described features can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs) etc.

The apparatus 400 may be implemented as an apparatus of any type capable of being configured to carry out the operation steps as discussed above. Examples include a laptop, a personal computer, and any other types of general purpose data processing apparatuses and devices. It may also be implemented as a mobile device, such as a mobile phone, a smart phone, a tablet computer, or a wearable device of any appropriate type.

Being illustrated as one unit in the schematic drawing of FIG. 4 does not necessitate that the image processing unit 401 is implemented as a single element or component. It may comprise two or more sub-units or sub-systems which each may be implemented using one or more physical components or elements.

Instead of, or in addition to the operations described above, the image processing unit 401 of the apparatus 400 of FIG. 4 may be configured to operate, when in use, according to any of the methods discussed above with reference to FIGS. 1 to 3C.

By the methods and the apparatuses shown in FIGS. 1 to 4, automatic decision on cinemagraph capture can be achieved.

Some embodiments are further discussed shortly in the following.

According to a first aspect, a method is presented. The method may be a method of automatic selection between media file types. The method comprises: receiving a sequence of digital images of a scene; performing, by a processor, object classification in at least one of the received digital images to determine the presence and class of one or more object in the scene; performing, by a processor, motion detection in the received sequence of digital images to determine the presence and salience of motion in the scene. The method further comprises automatically selecting, by a processor, a media file type on the basis of: the determined presence and class of an object in the scene, and presence and salience of motion in the scene, wherein the media file type is selected from a still image and a cinemagraph; and creating a media file of the selected media file type from the received sequence of digital images.

In an embodiment, in addition to the above embodiment, the sequence of digital images of a scene is received from an active camera used to capture the sequence of digital images.

In an embodiment, in addition to the above embodiment, the method comprises buffering three or more frames of the received sequence of digital images of a scene in a memory, and receiving a user command to create a media file, wherein the object classification and motion detection are performed in the buffered three or more frames preceding the user command to create a media file.

In an embodiment, in addition to the above embodiment, the method comprises monitoring stability and/or tilting state of the camera used to capture the digital images, wherein the conditions for selecting a media file type also comprise the measured stability and/or tilting of the camera used to capture the digital images.

In an embodiment, in addition to the above embodiment, a still image is selected as the media file type if the monitored stability and/or tilting state of the camera exceed a predetermined threshold at the time when the user command to create a media file is received.

In an embodiment, alternatively or in addition to the above embodiments, a cinemagraph is selected as the media file type if the scene includes: an object of at least one predetermined class, and a salient motion in at least one area of the scene.

In an embodiment, alternatively or in addition to the above embodiments, a cinemagraph is selected as the media file type if salient motion is detected in two or more areas of the scene, the method further comprising receiving a user selection of at least one of the two or more areas of the scene wherein salient motion was detected, and creating a cinemagraph with localized movement in the one or more areas of the scene selected by the user.

In an embodiment, alternatively or in addition to the above embodiments, a still image is selected as the media file type if no objects of at least one predetermined class are determined to be present in the scene, or if no motion is determined to be present in the scene.

In an embodiment, alternatively or in addition to the above embodiments, the media file type is selected from a still image, a cinemagraph and a living image of the scene, the living image comprising a still image and a preceding image sequence.

In an embodiment, in addition to the above embodiment, the media file type is selected from a still image and a living image if the motion is detected in a majority of the scene and/or exceeds a predetermined intensity.

In an embodiment, in addition to the above embodiments, a living image of the scene is selected as the media file type if a motion present in the scene fulfils at least one predetermined parameter.

In an embodiment, alternatively or in addition to the above embodiments, the sequence of digital images of a scene is received from a pre-recorded video.

In an embodiment, in addition to the above embodiment, the method comprises creating two or more media files of the selected type from two or more parts the received pre-recorded video.

In an embodiment, alternatively or in addition to the above embodiments, if the presence of an object is detected in the scene, the method further comprises tracking the detected object in the received sequence of digital images.

In an embodiment, alternatively or in addition to the above embodiments, the method comprises comprising storing the created media file in a memory.

According to a second aspect, an apparatus is presented. The apparatus comprises an image processing unit configured to: receive a sequence of digital images of a scene; perform object classification in at least one of the received digital images to determine the presence and class of an object in the scene; perform motion detection in the received sequence of digital images to determine the presence and salience of motion in the scene; select a media file type on the basis of: the determined presence and class of an object in the scene, and presence and salience of motion in the scene, wherein the media file type is selected from a still image and a cinemagraph; and create a media file of the selected type from the received sequence of digital images.

In an embodiment, in addition to the above embodiment, the apparatus comprises a digital camera unit comprising a viewfinder configured to capture digital images of a scene, the image processing unit being connected to the digital camera unit to receive the captured digital images of a scene.

In an embodiment, in addition to the above embodiment, the apparatus comprises a motion detection unit configured to perform motion detection in the sequence of digital images of a scene captured in the viewfinder of the digital camera unit, wherein the image processing unit is configured to perform motion detection in the received sequence of digital images based on the motion detection performed by the motion detection unit.

In an embodiment, alternatively or in addition to the above embodiments, the image processing unit is configured to track a detected object in the received sequence of digital images. In an alternative embodiment, the apparatus includes an object tracking unit configured to track a detected object in the received sequence of digital images.

The image processing unit is then configured to receive object tracking information from the object tracking unit.

In further embodiments, the image processing unit can be configured to perform any of the operations presented above in embodiments of the method according to the first aspect.

According to a third aspect, a system is presented. The system comprises: an image processing unit configured to receive a sequence of digital images of a scene; an object classification unit configured to perform object classification in at least one of the received digital images to determine the presence and class of an object in the scene; a motion detection unit configured to perform motion detection in the received sequence of digital images to determine the presence and salience of motion in the scene. The image processing unit is further configured to: select a media file type on the basis of: the determined presence and class of an object in the scene, and presence and salience of motion in the scene, wherein the media file type is selected from a still image, a cinemagraph and a living image; and create a media file of the selected type from the received sequence of digital images.

In a fourth aspect, a computer program, which may be stored on a computer-readable medium, may comprise program code instructions which, when run on a processor, cause the processor to carry out at least part of the operations of the method of the first aspect or any of the specific embodiments thereof discussed above.

In a fifth aspect, an apparatus is disclosed. The apparatus comprises means for carrying out the operations of any of the methods described above.

Although some of the present embodiments may be described and illustrated herein as being implemented in a smartphone, a mobile phone, a digital camera or a tablet computer, these are only examples of a device and not a limitation. As those skilled in the art will appreciate, the present embodiments are suitable for application in a variety of different types of devices that comprise a digital camera and/or are capable of processing digital images.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The operations of the methods described herein may be performed by an apparatus comprising means for performing each of the operations.

The term "comprising" is used in this specification to mean including the features followed thereafter, without excluding the presence of one or more additional features.

The invention claimed is:

1. A method, comprising:
receiving a sequence of digital images of a scene;
performing, by a processor, object classification in at least one of the received digital images to determine the presence and class of an object in the scene, the object classification resulting at least in part in a location of the object in the scene;
performing, by a processor, motion detection in the received sequence of digital images to determine the presence and salience of motion in the scene based on the determined presence and class of the object in the scene;
automatically selecting, by a processor, a media file type on the basis of: the determined presence and class of the object in the scene, wherein the media file type is selected from a still image and a cinemagraph, the cinemagraph being selected if the scene includes an object of a defined class and the salience of motion is in an area of the scene associated with the location of the object in the scene, wherein the salience of motion is repeatable and below a defined intensity level; and
creating a media file of the selected media file type from the received sequence of digital images.

2. A method as defined in claim 1, wherein the sequence of digital images of a scene is received from an active camera used to capture the sequence of digital images, and wherein the motion detection comprises performing, in parallel, object classification, stability and titling monitoring of a camera acquiring the sequence of digital images, motion detection, and object tracking.

3. A method as defined in claim 2, comprising buffering three or more frames of the received sequence of digital images of a scene in a memory, and receiving a user command to create a media file, wherein
the object classification and motion detection are performed in the buffered three or more frames preceding the user command to create a media file.

4. A method as defined in claim 1, wherein the still image is selected as the media file type on the basis of the object class detection, wherein the detected object class is defined to limit selection to the still image when no other objects, or no objects of a different object class, are detected in the same scene.

5. A method as defined in claim 4, wherein a still image is selected as the media file type if the monitored stability and/or tilting state of the camera exceed a defined threshold at the time when the user command to create a media file is received.

6. A method as defined in claim 1, wherein the cinemagraph is not selected if the motion is fast and directional.

7. A method as defined in claim 1, wherein a cinemagraph is selected as the media file type if salient motion is detected in two or more areas of the scene, the method further comprising receiving a user selection of at least one of the two or more areas of the scene wherein salient motion was detected, and creating a cinemagraph with localized movement in the one or more areas of the scene selected by the user.

8. A method as defined in claim 1, wherein a still image is selected as the media file type if no objects of at least one defined class are determined to be present in the scene, or if no motion is determined to be present in the scene.

9. A method as defined in claim 1, wherein the media file type is selected from a still image, a cinemagraph and a living image of the scene, the living image comprising a still image and a preceding image sequence, and wherein the object classification comprises the following classes: objects more suitable for cinemagraph, objects more suitable for still image, and objects not suitable for cinemagraph.

10. A method as defined in claim 9, wherein the media file type is selected from a still image and a living image if the motion is detected in a majority of the scene and/or exceeds a defined intensity.

11. A method as defined in claim 10, wherein a living image of the scene is selected as the media file type if a motion present in the scene fulfils at least one defined parameter.

12. A method as defined in claim 1, wherein the sequence of digital images of a scene is received from a pre-recorded video.

13. A method as defined in claim 12, comprising creating two or more media files of the selected media file type from two or more parts of the received pre-recorded video.

14. A method as defined in claim 1, wherein, if the presence of an object is detected in the scene, the method further comprises tracking the detected object in the received sequence of digital images.

15. A method as defined in claim 1, comprising storing the created media file in a memory.

16. An apparatus, comprising a processor configured to act as an image processing unit to:
  receive a sequence of digital images of a scene;
  perform object classification in at least one of the received digital images to determine the presence and class of an object in the scene, the object classification resulting at least in part in a location of the object in the scene;
  perform motion detection in the received sequence of digital images to determine the presence and salience of motion in the scene based on the determined presence and class of the object in the scene;
  select a media file type on the basis of: the determined presence and class of the object in the scene, wherein the media file type is selected from a still image and a cinemagraph, the cinemagraph being selected if the scene includes an object of a defined class and the salience of motion is in an area of the scene associated with the location of the object in the scene, wherein the salience of motion is repeatable and below a defined intensity level; and
  create a media file of the selected media file type from the received sequence of digital images.

17. An apparatus as defined in claim 16, comprising a digital camera unit comprising a viewfinder configured to capture digital images of a scene, the image processing unit being connected to the digital camera unit to receive the captured digital images of a scene.

18. An apparatus as defined in claim 17, comprising a motion detection unit configured to perform motion detection in the sequence of digital images of a scene captured in the viewfinder of the digital camera unit, wherein the image processing unit is configured to perform motion detection in the received sequence of digital images based on the motion detection performed by the motion detection unit.

19. An apparatus as defined in claim 16, wherein the image processing unit is configured to track a detected object in the received sequence of digital images.

20. A system, comprising:
  at least one processor; and
  at least one memory comprising computer program code, the at least one memory and computer program code configured to, with the at least one processor, cause the at least one processor to:
  receive, by an image processing unit, a sequence of digital images of a scene;
  perform, by an object classification unit, object classification in at least one of the received digital images to determine the presence and class of an object in the scene, the object classification resulting at least in part in a location of the object in the scene;
  perform, by a motion detection unit, motion detection in the received sequence of digital images to determine the presence and salience of motion in the scene based on the determined presence and class of the object in the scene; wherein the image processing unit is further configured to:
  select a media file type on the basis of: the determined presence and class of the object in the scene, wherein the media file type is selected from a still image, a cinemagraph and a living image, the cinemagraph being selected if the scene includes an object of a defined class and the salience of motion is in an area of the scene associated with the location of the object in the scene, wherein the salience of motion is repeatable and below a defined intensity level; and
  create a media file of the selected media file type from the received sequence of digital images.

* * * * *